United States Patent [19]
Sweet, II et al.

[11] 3,960,293

[45] June 1, 1976

[54] CENTRIFUGAL ARRANGING AND FEEDING APPARATUS

[75] Inventors: John R. Sweet, II, Sunnyvale; Kingsley Chan, Saratoga, both of Calif.

[73] Assignee: Acurex Corporation, Mountain View, Calif.

[22] Filed: Feb. 13, 1975

[21] Appl. No.: 549,691

[52] U.S. Cl. ............................ 221/258; 221/277; 221/167; 198/34
[51] Int. Cl.² .................................... B65G 59/00
[58] Field of Search ........... 221/277, 258, 289, 167, 221/168, 169, 170; 133/3 R, 3 A, 8 R, 8 A; 198/34

[56] References Cited
UNITED STATES PATENTS

| | | | |
|---|---|---|---|
| 2,109,658 | 3/1938 | Zierick | 133/3 A |
| 2,137,501 | 11/1938 | Myers | 133/8 R |
| 2,601,570 | 6/1952 | Suthers | 221/277 |
| 2,829,769 | 4/1958 | Rockafellow | 221/277 X |
| 3,021,980 | 2/1962 | Gladfelter et al. | 221/167 |

Primary Examiner—Allen N. Knowles
Attorney, Agent, or Firm—Flehr, Hohbach, Test, Albritton & Herbert

[57] ABSTRACT

Centrifugal arranging and feeding apparatus in which the articles to be arranged are introduced toward the center of a rotating disk. Outward movement of the articles is limited by a flexible retaining ring which is lifted in a first region of rotation to permit articles to pass to the periphery of the disk. In a second region, the articles pass from the periphery of the disk onto an elevator ring which lifts the articles to a delivery ring. A guide retains the articles on the delivery ring until they reach a discharge region where they are delivered from the ring in a generally tangential direction.

15 Claims, 6 Drawing Figures

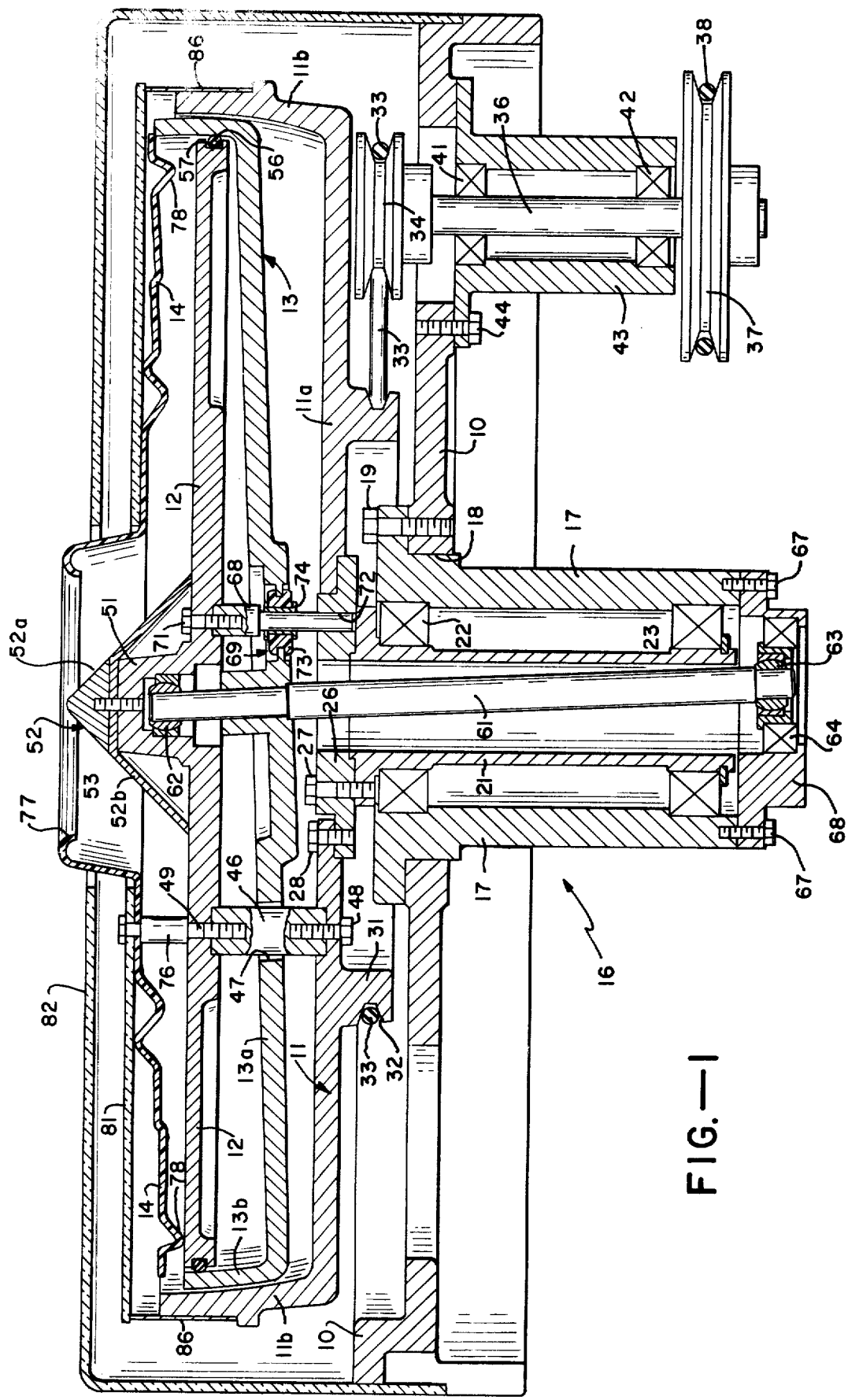
FIG.—1

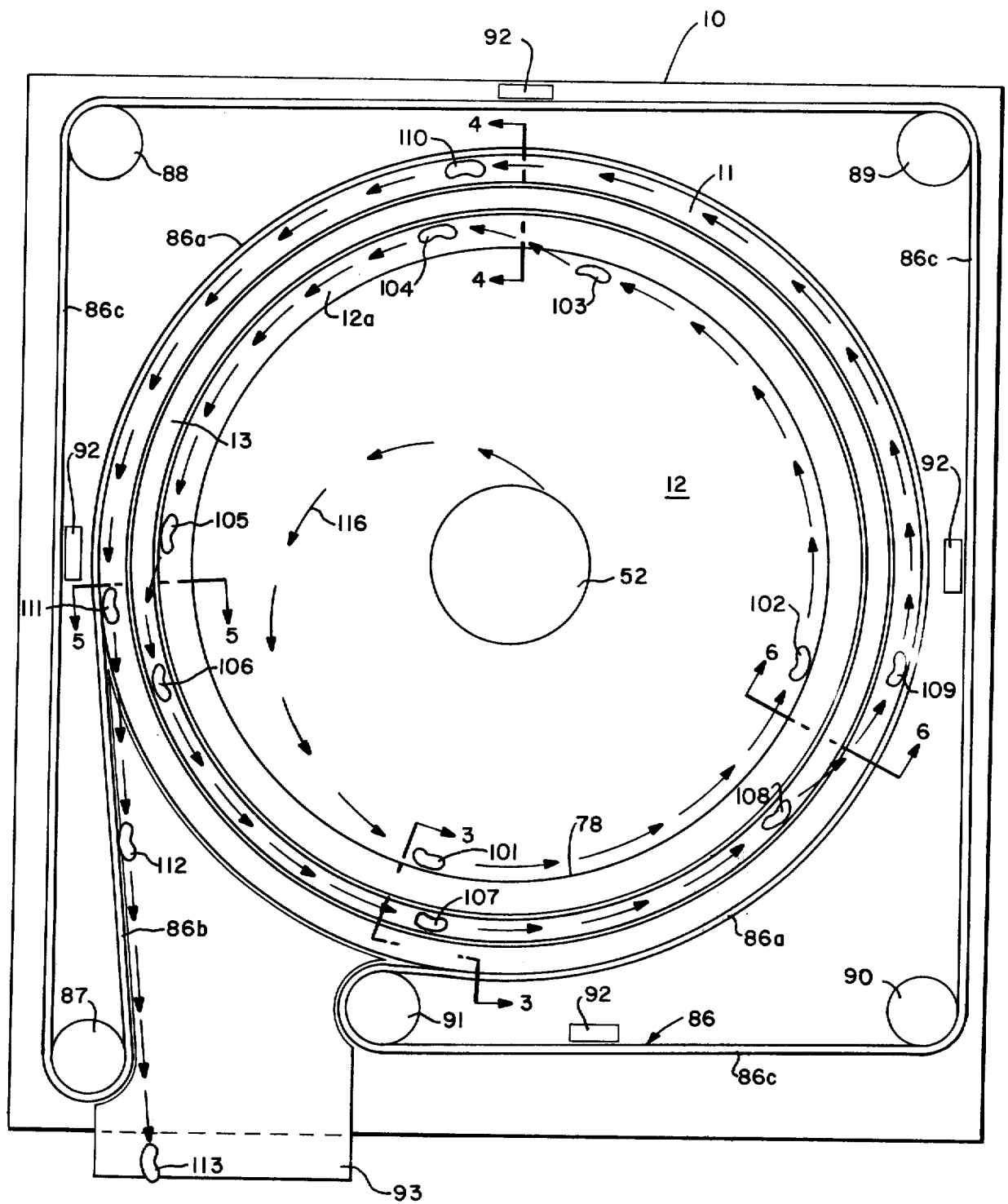
FIG.—2

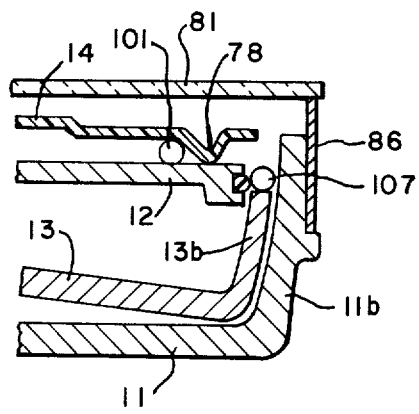
FIG.—3
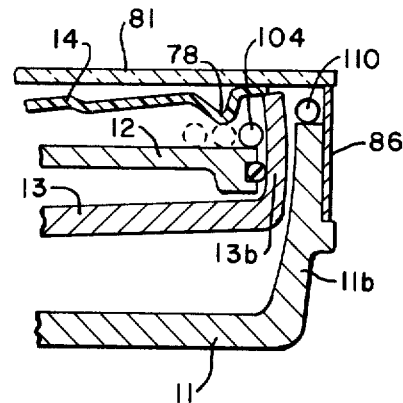
FIG.—4
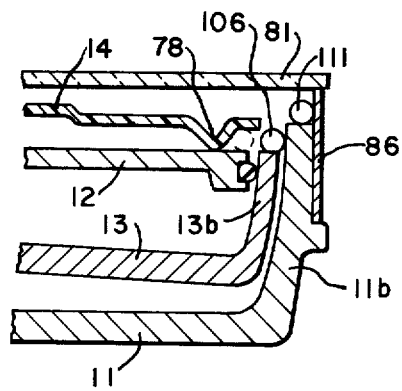
FIG.—5
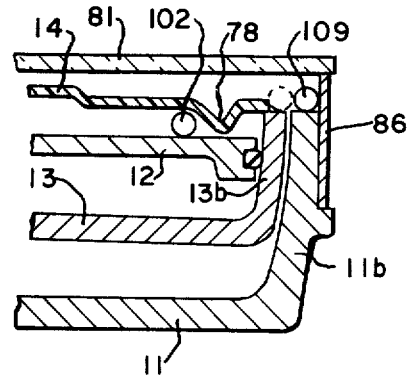
FIG.—6

CENTRIFUGAL ARRANGING AND FEEDING APPARATUS

BACKGROUND OF THE INVENTION

This invention pertains generally to arranging and sorting apparatus and most particularily to centrifugal feeding apparatus particularily suitable for use with sorting apparatus such as a color sorter.

In color sorting apparatus of the type disclosed in U.S. Pat. No. 3,750,881, issued Aug. 7, 1973, articles to be sorted are arranged in a single file by allowing them to fall by gravity along a pair of inclined counter-rotating rollers. At the end of the rollers, the articles drop through an inspection station where they are scanned by photoelectric devices, and thereafter the articles are delivered to either an accept shute or a reject shute, depending on the color. While such apparatus works satisfactorily in some applications, it is limited in speed by the rate at which the articles fall from the counter-rotating rollers.

SUMMARY AND OBJECTS OF THE INVENTION

The invention provides centrifugal arranging and feeding apparatus in which the articles to be arranged are introduced toward the center of a rotating disk. Outward movement of the articles is limited by a flexible escapement ring which is lifted in a first region of rotation to permit articles to pass through the periphery of the disk. In a second region, the articles pass from the periphery of the disk onto an elevator ring which lifts the articles to a delivery ring. A guide retains the articles on the delivery ring until they reach a discharge region where they are delivered from the ring in a generally tangential direction.

It is in general an object of the invention to provide new and improved arranging and feeding apparatus.

Another object of the invention is to provide arranging and feeding apparatus of the above character which is centrifugal in operation.

Additional objects and features of the invention will be apparent from the following description in which the preferred embodiment is set forth in detail in conjunction with the accompanying drawings.

BRIEF DESCRIPTION OF THE DRAWINGS

FIG. 1 is a center line sectional view of one embodiment of arranging and feeding apparatus according to the invention.

FIG. 2 is a top plan view, largely schematic, of the arranging and feeding apparatus of FIG. 1, illustrating the path of articles in the apparatus.

FIG. 3 is a fragmentary sectional view taken along line 3—3 in FIG. 2.

FIG. 4 is a fragmentary sectional view taken along line 4—4 in FIG. 2.

FIG. 5 is a fragmentary sectional view taken along line 5—5 in FIG. 2.

FIG. 6 is a fragmentary sectional view taken along line 6—6 in FIG. 2.

DESCRIPTION OF THE PREFERRED EMBODIMENT

As illustrated, the arranging and feeding apparatus includes a generally rectangular base plate 10, a main wheel or delivery ring 11, a disk 12 for receiving articles to be arranged, an elevator ring 13, and an escapement ring 14. The base plate extends in a generally horizontal direction, and the delivery ring, disk, elevator ring and escapement ring are constrained for rotation together above the base plate.

Delivery wheel 11 includes a hub portion 11a and an upstanding rim portion 11b, and it is rotatively mounted on base plate 10 by means of a spindle assembly 16. This assembly includes a spindle housing 17 which extends through an opening 18 in the base plate and is secured to the base plate by screws 19. A vertically extending spindle 21 is rotatively mounted in the spindle housing by means of antifriction bearings 22, 23. A flange 26 is secured to the upper portion of spindle 21 by bolts 27, and the hub portion 11a of the delivery ring is secured to the flange by bolts 28.

The delivery ring is formed to include a depending pulley flange 31 having a peripheral grove 32 in which a drive belt 33 is mounted. This belt is driven by a pulley 34 which is mounted on a shaft 36. A second pulley 37 is mounted on the shaft and driven by a motor (not shown) and drive belt 38. Shaft 36 is rotatively mounted by antifriction bearings 41, 42 carried by a housing 43 which is bolted to base plate 10, as illustrated at 44.

Disk 12 is surmounted on the hub portion of delivery ring 11 and spaced therefrom by mounting posts 46 which pass through clearance holes 47 in elevator ring 13. In the preferred embodiment, four mounting posts are provided, and they are spaced equally about the center of the disk. The delivery ring and disk are secured to the mounting posts by bolts 48, 49. The disk lies in a generally horizontal plane and rotates with ring 11 about a vertical axis.

Disk 12 is formed to include a raised hub 51 on which a distribution cone 52 is mounted. This cone comprises an upper section 52a and a lower section 52b which are secured to the raised hub by means of a threaded stud 53. An O-ring 56 is mounted in a peripheral groove 57 in disk 12 and forms a dust seal between the disk and the elevator ring 13.

Elevator ring 13 has a hub portion 13a and an upstanding rim 13b. This ring is mounted on a shaft 61 which is inclined relative to the vertical axis of delivery ring 11 and disk 12. The upper end of shaft 61 is mounted in a spherical bearing 62 which is mounted in the raised hub of disk 12. The lower end of shaft 61 is mounted in a spherical bearing 63 which is retatively mounted in an antifriction bearing 64 carried by an end cap 66 secured spindle housing 17 by bolts 67. Upper bearing 63 is disposed coaxially of ring 11 and disk 12, and lower bearing 63 is displaced from the axis of the ring and disk. The amount of displacement determines the amount of vertical movement or lift provided at the rim of elevator ring 13, and in the preferred embodiment, the mounting holes for bolts 67 are slotted to permit adjustment of the displacement. The point at which the maximum lift occurs can be adjusted by changing the rotative position of the end cap.

Elevator ring 13 is constrained for rotation with delivery ring 11 and disk 12 by means of drive pins 68 and flexible bushing assemblies 69. Pins 68 are secured to disk 123 by screws 71 and are received in bores 72 in spindle flange 26. In the preferred embodiment, three drive pins and bushing assemblies are provided, and they are spaced equally about the axis of disk 12. Each of the bushing assemblies comprises a rubber grommet 73 which is mounted in an opening of the hub portion of elevator ring 13 and a flanged bushing 74 which is mounted in the opening of the grommet and slidablely mounted on pin 68.

Escapement ring 14 is fabricated of a flexible material such as Lexan, and it is mounted above disk 12 on spacers 76 on screws 49. The inner portion of the escapement ring forms an opening 77 through which articles to be arranged can be introduced to cone 52 and disk 12. The escapement ring is formed to include a depending rib 78 which normally rests upon the surface of disk 12 and forms a retaining ring which limits the outward movement of articles on the disk. The outer periphery of escapement ring 14 overlies the inner portion of rim of elevator ring 13 whereby the elevator ring can engage the escapement ring to lift a portion of the retaining ring away from the disk to permit articles to move to the periphery of the disk.

A dust cover 81 is mounted above escapement ring 14 and secured thereto by bolts 49. A safety shield 82 is mounted on base plate 10 and encloses the rotating parts of the apparatus. In the preferred embodiment, both the dust cover and the safety shield are fabricated of a transparent material such as Plexiglass.

An endless guide belt 86 is trained about the periphery of delivery ring 11 and a plurality of pulleys 87-91 which are rotatively mounted on base plate 10. The belt includes an inner run 86a which extends around a substantial portion of the delivery ring, a tangential run 86b which extends from one end of the inner run to pulley 87, and an outer run 86c which extends around pulleys 87-91 to the other end of inner run 86a. A portion of the belt extends above the rim of the delivery ring and limits the outward movement of articles carried by this ring.

Belt stablizers 92 mounted on base plate 10 engage the outer run of the belt midway between the pulleys to eliminate vibration in the belt, and a horizontally extending guide 93 is mounted on the base plate adjacent to the tangential run of the belt. The upper surface of the guide is generally level with the rim of delivery ring 11.

Operation and use of the arranging and feeding apparatus can best be described with reference to FIGS. 2–6. It is assumed that the drive motor has been energized so that ring 11, disk 12 and ring 13 rotate in the counter-clockwise direction, as viewed in FIG. 2, and that tangential belt run 86b has been aligned in the direction in which the articles are to be delivered.

Articles such as beans 101–113 are poured through opening 77 onto cone 52, and because of the sloping surface of the cone and the centrifugal force produced by the rotation of disk 12, the beans move in an outward direction toward the periphery of the disk along a path such as that indicated by arrows 116. Outward movement of the articles is limited by retaining ring 78, as illustrated by beans 101–103. In the region in which the sectional view of FIG. 4 is taken, elevator ring 13 reaches its maximum height, lifting retaining ring 78 away from disk 12, thereby permiting the articles in that region to pass to the periphery 12a of the disk, as illustrated by beans 104 and 105. Further outward movement of the beans is prevented by the inner wall of the elevator ring between the region of FIG. 4 and the region of FIG. 5. By the time the beans reach the region of FIG. 5, the elevator ring has dropped to the level of disk 12 and the beans move out onto the elevator ring, as illustrated by beans 106–108.

The elevator ring continues to drop as the beans approach the region of FIG. 3, and further outward movement is prevented by the inner wall of delivery ring 11. As the beans approach the region of FIG. 6, the elevator ring rises to the level of the delivery ring, and the beans are transferred to the rim of the delivery ring, as illustrated by beans 109–111.

From the region of FIG. 6 to the region of FIG. 5, outward movement of the beans from the rim of delivery ring 11 is prevented by belt 86. Where the belt leaves the ring in the region of FIG. 5, the beans also leave the ring in a generally tangential direction and slide along the surface of guide 93. The beans continue to travel in this direction when the belt loops about pulley 87 and begins its return run. The beans pass out of the apparatus through a suitable opening in safety guard 82.

The invention has a number of important features and advantages. It enables articles to be arranged in a single file and fed in a desired direction at a faster rate than possible with the counter-rotating rollers of the prior art. The delivery ring might, for example, have a peripheral speed on the order of 100 to 200 inches per second, and at this speed, articles having a length of one-fourth inch would be delivered at a rate of 400 to 800 articles per second.

It is apparent from the foregoing that a new and improved centrifugal arranging and feeding apparatus has been provided. While only the preferred embodiment has been described, as will be apparent to those familiar with the art, certain changes and modifications can be made without departing from the scope of the invention as defined by the following claims.

We claim:

1. In apparatus for delivering articles single file in a predetermined direction: a disk mounted for rotation about a vertical axis and adapted to receive articles to be delivered toward the center thereof, said articles being urged outwardly toward the periphery of the disk by centrifugal force as the disk rotates, means forming a retaining ring adjacent to the surface of the disk for limiting outward movement of the articles a predetermined distance from the center of the disk, a delivery ring adjacent to the periphery of the disk and constrained for rotation with the disk, means for lifting the retaining ring away from the disk in a first region of disk travel to permit the articles to move to the periphery of the disk in that region and effecting a transfer of the articles from the periphery of the disk to the delivery ring in a second region of travel, and guide means for retaining the articles on the delivery ring between the second region and a discharge region where the articles are released for delivery along a line extending generally tangentially of the delivery ring in the predetermined direction.

2. The apparatus of claim 1 wherein the means for lifting the retaining ring and effecting a transfer of the articles comprises an elevator ring mounted for rotation about an axis displaced angularly of the axis of the disk.

3. The apparatus of claim 2 wherein the means forming a retaining ring comprises a generally planar flexible escapement member having a depending circular rib forming the retaining ring, the outer portion of said escapement member overlying a portion of the elevator ring.

4. The apparatus of claim 1 wherein the guide means comprises an endless belt having an inner run trained about a portion of the periphery of the delivery ring, a generally tangential run extending from one end of the inner run along the predetermined line, and an outer run extending from the tangential run to the other end of the inner run, a portion of said belt extending above the periphery of the delivery ring to limit radial movement of the articles between the second region and the discharge region.

5. The apparatus of claim 1 further including an upstanding cone disposed centrally of the disk for imparting an initial radial movement to articles dropped thereon.

6. In apparatus for delivering articles single file in a predetermined direction: a disk mounted for rotation about a vertical axis and adapted to receive articles to be delivered toward the center thereof, said articles being urged outwardly toward the periphery of the disk by centrifugal force as the disk rotates, a delivery ring disposed coaxially of the disk and constrained for rotation therewith, said ring having an annular lip spaced radially from and above the periphery of the disk, an elevator ring mounted for rotation about an axis displaced angularly of the axis of the disk, said elevator ring having an annular lip disposed between the periphery of the disk and the lip of the delivery ring, a flexible generally planar escapement member disposed coaxially of the disk and including a depending circular rib adjacent to the surface of the disk for limiting outward movement of the articles on the disk, the outer portion of the escapement member overlying a portion of the elevator ring whereby the elevator ring can lift a portion of the escapement member to permit articles to move to the periphery of the disk in a first region of rotation, said elevator ring serving to prevent movement of the articles beyond the periphery of the disk in the first region and further serving to lift the articles from the level of the disk to the level of the lip of the delivery ring in a second region, and guide means adjacent to the periphery of the delivery ring for preventing radial movement of articles on the lip of the delivery ring between the second region and a discharge region where the articles are released for delivery along a line extending generally tangentially of the delivery ring in the predetermined direction.

7. The apparatus of claim 6 wherein the guide means comprises an endless belt having an inner run trained about a portion of the periphery of the delivery ring, a generally tangential run extending from one end of the inner run along the predetermined line, and an outer run extending from the tangential run to the other end of the inner run, a portion of said belt extending above the periphery of the delivery ring to limit radial movement of the articles between the second region and the discharge region.

8. The apparatus of claim 6 further including an upstanding cone disposed centrally of the disk for imparting an initial radial movement to articles dropped thereon.

9. The apparatus of claim 6 wherein the disk, escapement member and delivery ring are constrained for rotation together by drive pins extending therebetween.

10. The apparatus of claim 9 wherein the drive pins are generally parallel to the axis of the disk and the elevator ring is constrained for rotation with the disk, escapement member and delivery ring by flexible bushing assemblies slidably engaging the drive pins.

11. The apparatus of claim 6 wherein the guide means comprises an endless belt having a first run trained about a portion of the periphery of the discharge ring and a generally tangential run extending from the first run along the predetermined line, together with a guide member adjacent to the tangential run for supporting the articles in the discharge region.

12. In apparatus for delivering articles single file in a predetermined direction: a horizontally disposed member mounted for rotation about a vertical axis and adapted to receive the articles toward the center thereof, said articles being urged outwardly from the center of the member by centrifugal force as the member rotates, retaining means movable between first and second positions for limiting outward movement of the articles a predetermined distance from the center of the rotating member when in the first position and permitting outward movement of the articles in in the second position, discharge means proximate to the outer periphery of the rotating member for delivering the articles in the predetermined direction, and means for moving the retaining means from the first position to the second position while the member is rotating to release a limited quantity of the articles for outward movement toward the discharge means.

13. The apparatus of claim 12 further including additional retaining means for limiting outward movement of the articles a second predetermined distance from the center of the rotating member and means for actuating the additional retaining means to release the articles for further outward movement toward the discharge means.

14. In apparatus for delivering articles single file in a predetermined direction: a horizontally disposed member mounted for rotation about a vertical axis and adapted to receive the articles toward the center thereof, said articles being urged outwardly from the center of the member by centrifugal force as the member rotates, a flexible escapement ring mounted on the rotating member and engaging the upper surface of the member for limiting outward movement of the articles a predetermined distance from the center of the member, discharge means positioned toward the outer periphery of the rotating member for delivering the articles in the predetermined direction, and means for lifting a portion of the escapement ring away from the disk in a predetermined region to release a limited quantity of the articles for outward movement toward the discharge means.

15. The apparatus of claim 14 further including additional retaining means for limiting outward movement of the articles a predetermined distance from the center of the rotating member and means for actuating the additional retaining means to release the articles for further outward movement toward the discharge means.

* * * * *